(12) United States Patent
Shimma et al.

(10) Patent No.: US 6,566,005 B1
(45) Date of Patent: May 20, 2003

(54) BATTERY PACK WITH AN IMPROVED COOLING STRUCTURE

(75) Inventors: Yasutoshi Shimma, Anjo (JP); Junichi Masuda, Okazaki (JP); Shingo Umemura, Okazaki (JP); Kazuyuki Sakakibara, Okazaki (JP)

(73) Assignee: Makita Corporation, Anjo (JP)

( * ) Notice: Subject to any disclaimer, the term of this patent is extended or adjusted under 35 U.S.C. 154(b) by 110 days.

(21) Appl. No.: 09/707,101

(22) Filed: Nov. 6, 2000

(30) Foreign Application Priority Data

Nov. 10, 1999 (JP) .......................................... 11-320202

(51) Int. Cl.[7] .......................... H01M 2/00; H01M 2/12; H01M 10/50
(52) U.S. Cl. ......................... 429/148; 429/83; 429/120; 429/71; 429/99
(58) Field of Search ............................ 429/99, 100, 96, 429/148, 160, 72, 82, 83, 71, 57, 53, 120

(56) References Cited

U.S. PATENT DOCUMENTS 6,304,058 B2 * 10/2001 Watson et al. .............. 320/117

FOREIGN PATENT DOCUMENTS

| EP | 0 920 105 A2 | 6/1999 | |
|---|---|---|---|
| EP | 920105 | * 6/1999 | ............. H02J/7/00 |

* cited by examiner

Primary Examiner—Stephen Kalafut
Assistant Examiner—Raymond Alejandro
(74) Attorney, Agent, or Firm—Lahive & Cockfield, LLP (57) ABSTRACT

A battery pack (1) includes an air intake port (9), air discharge ports (11), first air passages (24), and a second air passage (25). Cooling air introduced into the battery pack through the air intake port (9) flows around and through two cell groups contained in the pack before exiting to the pack from the discharge ports (11). As the intake port and the discharge ports are both provided at an upper enclosure (4) of the battery pack that is set on a charger (50) for charging or an electric power tool as a power source, neither intake port nor the discharge ports are exposed to the exterior environment whether the pack is set on the charger or attached to a power tool.

13 Claims, 11 Drawing Sheets

BATTERY PACK WITH AN IMPROVED COOLING STRUCTURE

This application claims priority on Japanese Patent Application No. 11-320202 filed on Nov. 10, 1999, the contents of which are incorporated herein by reference.

BACKGROUND OF THE INVENTION

1. Field of the Invention

The present invention relates to a battery pack containing a plurality of cells for use with a charger or battery-powered devices, such as power tools, as a power source. More particularly, the invention relates to a battery pack with an improved structure for cooling the cells during a charge.

2. Description of the Related Art

A conventional battery pack includes on the top surface thereof a mounting portion which in turn includes electrical terminals for the establishment of electric contact between the battery pack and a charger or a battery-powered device, such as an electric power tool. The battery pack can be recharged by attachment of its mounting portion onto the charger, and also can be used as a power source by attachment of the mounting portion onto a battery-powered device. However, the cells of the battery pack tend to generate heat during each charge, which results in degradation of the cells. To avoid such a disadvantage, a means for cooling the battery cells is typically provided in the battery pack. For example, disclosed in Japan Published Unexamined Patent Application No. 11-219733 is a battery pack which is provided with a cooling structure therein. The structure includes air passages running through the battery pack case and along and between the cells within the battery pack and a plurality of apertures forming intake and discharge ports provided at the top and bottom portions of the battery pack, whereby the intake ports are disposed at a mounting portion to which a charger is attached, with the air passages in communication with both the intake and discharge ports. Thus, cooling air from a blower or fan incorporated in the charger can be introduced from the intake ports to be sent into the interior of the pack through the air passages and outside the pack from the discharge ports so that the heat generated by the cells during a charge is dissipated therefrom.

While the foregoing battery pack with a cooling structure for the battery cells contained therein achieves its intended objective, it is not free from certain problems and inconveniences, thus leaving room for improvement. For example, in the above described structure, foreign substances such as dust and other various types of debris can easily enter the interior of the battery pack, as the discharge ports, which are provided at the bottom of the battery pack and are in communication with the air passages, are exposed in an upward direction to the external environment when the battery pack is mounted onto the charger for a charge. If such substances are electrically conductive, this may result in occurrence of a short circuit in the battery pack. Also, when the battery pack is mounted onto battery-powered tools, not only debris but even rain drops may enter the battery pack if such tools are used in environments in which the tool is exposed to rain, since the pack's bottom surface where the discharge ports are located is exposed to the exterior environment. This also may cause rust, corrosion, or liquid electrolyte leakage of the cells.

SUMMARY OF THE INVENTION

In view of the above-identified problems, a primary object of the present invention is to provide a battery pack for use with a charger or battery-powered devices which can eliminate the possible causes of the above-identified problems by prevention of foreign substances from intruding into the battery pack when the battery pack is mounted onto a charger or battery-powered devices without reducing the effect of cooling the cells during each charge.

The above objects and other related objects are realized by the invention, which provides a battery pack including: an outer enclosure containing a plurality of battery cells and having a mounting portion adapted to be removably attached to a charger and other electric devices; at least one intake port provided in the mounting portion for introducing into the battery pack cooling air supplied from a charger; and at least one discharge port provided in the mounting portion for discharging the cooling air from the battery pack. The battery pack further includes at least one air passage connecting the at least one intake port to the at least one discharge port such that the at least one air passage allows the cooling air introduced through the at least one intake port to flow along and/or between the cells and to be discharged through the at least one discharge port. As the at least one intake port and the at least one discharge port of the air passage are both provided at the mounting portion of the battery pack, neither port is exposed to the exterior of the battery pack when the pack is mounted on a charger or another electric device. This structure prevents foreign substances such as water, dust and other various types of debris from entering the interior of the battery pack, such that rust, corrosion, or liquid electrolyte leakage of the cells which may otherwise be caused by ingression of such foreign substances do not occur.

According to one aspect of the present invention, the mounting portion includes a substantially rectangular top plate having a first edge and an opposite second edge, with the at least one intake port being formed on the top plate in proximity to the first edge and the at least one discharge port being formed in proximity to the second edge.

According to another aspect of the present invention, the mounting portion is contoured to generally correspond to a connecting portion of the charger and those of the aforementioned other electric devices such that, when the battery pack is attached to any of the charger and the aforementioned other electric devices, the at least one intake port and the at least one discharge port are unexposed to the exterior environment of the battery pack and the electric device to which the battery pack is currently attached.

According to still another aspect of the present invention, when the battery pack is attached to the charger, a narrow gap is formed at least along the second edge of the top plate between the mounting portion of the battery pack and the connecting portion of the charger so as to facilitate discharge of cooling air from the at least one discharge port.

According to yet another aspect of the present invention, the mounting portion includes a step along the second edge where the at least one discharge port are provided, the step forming the narrow gap with the connecting portion of the charger.

According to one feature of the present invention, the battery pack further includes an inner case holding the cells and includes a plurality of radiators in contact with the cells, and the at least one air passages are separated from the cells by the inner case. As the radiator plates, which are brought into contact with the battery cells, are included on the inner case, the dustproof effect for the cells is further enhanced without reducing the effect of cooling the cells.

According to another feature of the present invention, each radiator is a radiator plate having a plurality of fins protruding into the air passage and oriented substantially in parallel to the direction of the flow of cooling air introduced through the at least intake port.

According to still another feature of the present invention, the number of fins of each radiator plate increases in the downstream direction of the cooling airflow.

According to yet another feature of the present invention, the battery pack includes a pair of slide rails on the mounting portion and each of the charger and the electric devices includes on the connecting portion thereof a pair of guide rails which can slidably engage the slide rails such that the battery pack is attached to the charger and the electric devices by slide motion.

According to one practice of the present invention, the plurality of cells are divided into two groups by a longitudinal gap formed through the inner case, and one of the air passages is at least partially defined by the gap between the two cell groups.

According to another practice of the present invention, the outer enclosure includes two inner longitudinal walls and the inner case includes two outer longitudinal walls which opposes the inner longitudinal walls across a selected distance so as to at least partially define two of the air passages between the outer longitudinal walls and the inner longitudinal walls.

According to still another practice of the present invention, the electric devices include electric power tools.

According to yet another practice of the present invention, the charger includes a housing, at least one inlet port provided in the housing, and at least one exhaust port provided in the housing. When the battery pack is set on the charger for charging, the at least one inlet port is located in the portion of the housing directly opposing the at least one discharge of the battery pack so as to allow the cooling air discharged out of the discharge ports of the battery pack to reenter the charger through the inlet port and to be discharged from the charger through the exhaust port.

The invention is also directed to a battery pack charging system comprising a battery pack and a charger on which the battery pack is set for charging. The battery pack includes: an outer enclosure containing a plurality of battery cells and having a mounting portion adapted to be removably attached to the charger and other electric devices; at least one intake port provided in the mounting portion for introducing cooling air into the battery pack from the charger; at least one discharge port provided in the mounting portion for discharging the cooling air from the battery pack; and at least one air passage connecting the at least one intake port to the at least one discharge port, with the at least one air passage allowing the cooling air introduced through the at least one intake port to flow along and/or between the cells and to be discharged through the at least one discharge port. The charger includes: a housing having a connecting portion to which the mounting portion of the battery pack is attached for charging; a fan contained within the housing for supplying cooling air to the battery pack; and at least one airflow passage port formed in the connecting portion for directing the cooling air supplied from the fan into the intake port of the battery pack when the battery pack is set on the charger.

In one embodiment, the charger further includes: at least one inlet port formed in the portion of the connecting portion opposing the at least one discharge when the battery pack is set on the charger; and at least one exhaust port formed in the connecting portion and placed in pneumatic communication with the at least one inlet port. In this embodiment, at least part of the cooling air discharged from the discharge port of the battery pack is allowed to reenter the charger through the inlet port and to exit from the charger through the exhaust port.

Other general and more specific objects of the invention will in part be obvious and will in part be evident from the drawings and descriptions which follow.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENTS

The preferred embodiment according to the present invention will be described hereinafter with reference to the attached drawings.

Figure 1:
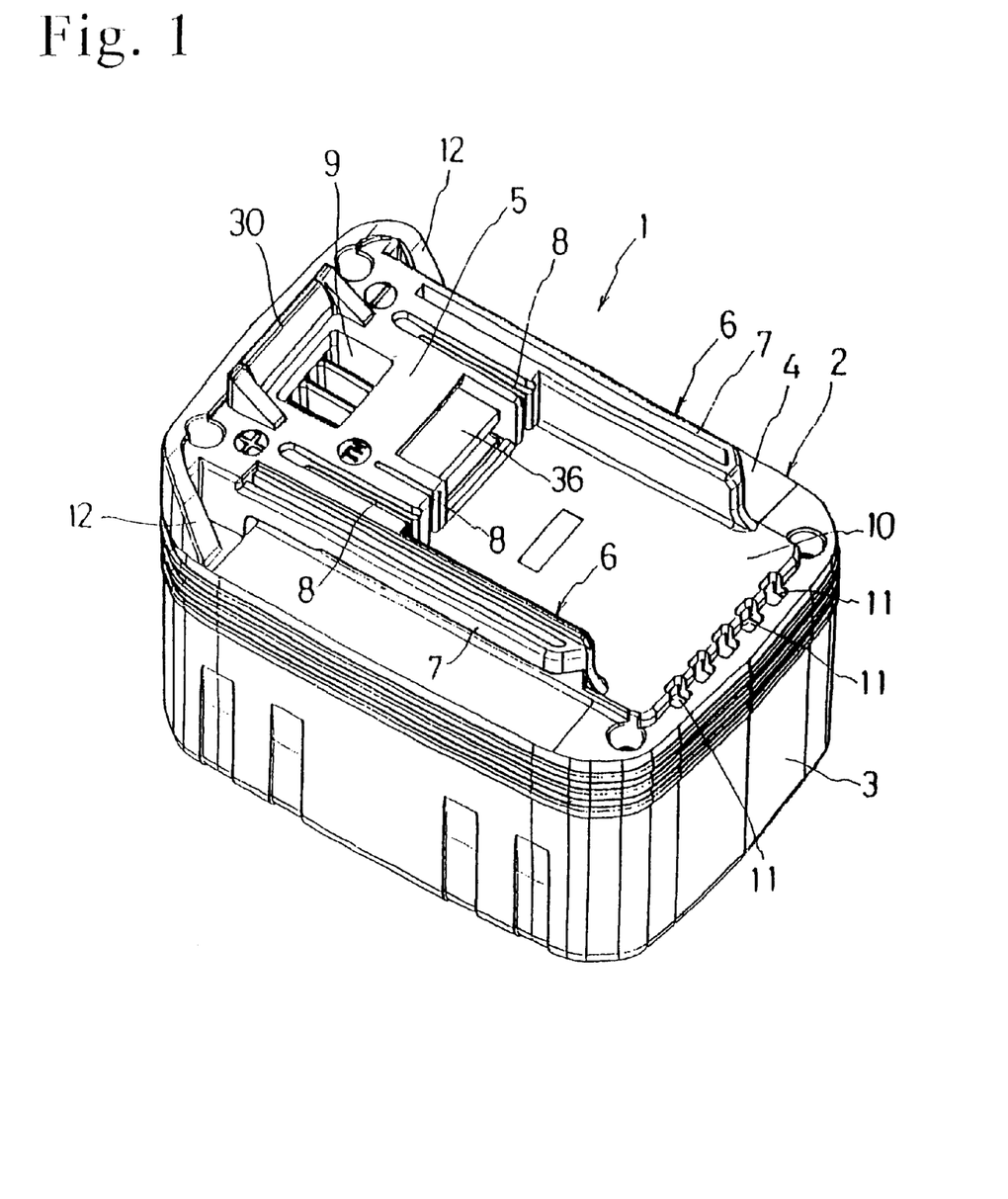
FIG. 1 is a perspective view of a battery pack in accordance with the present invention.
Figure 2:
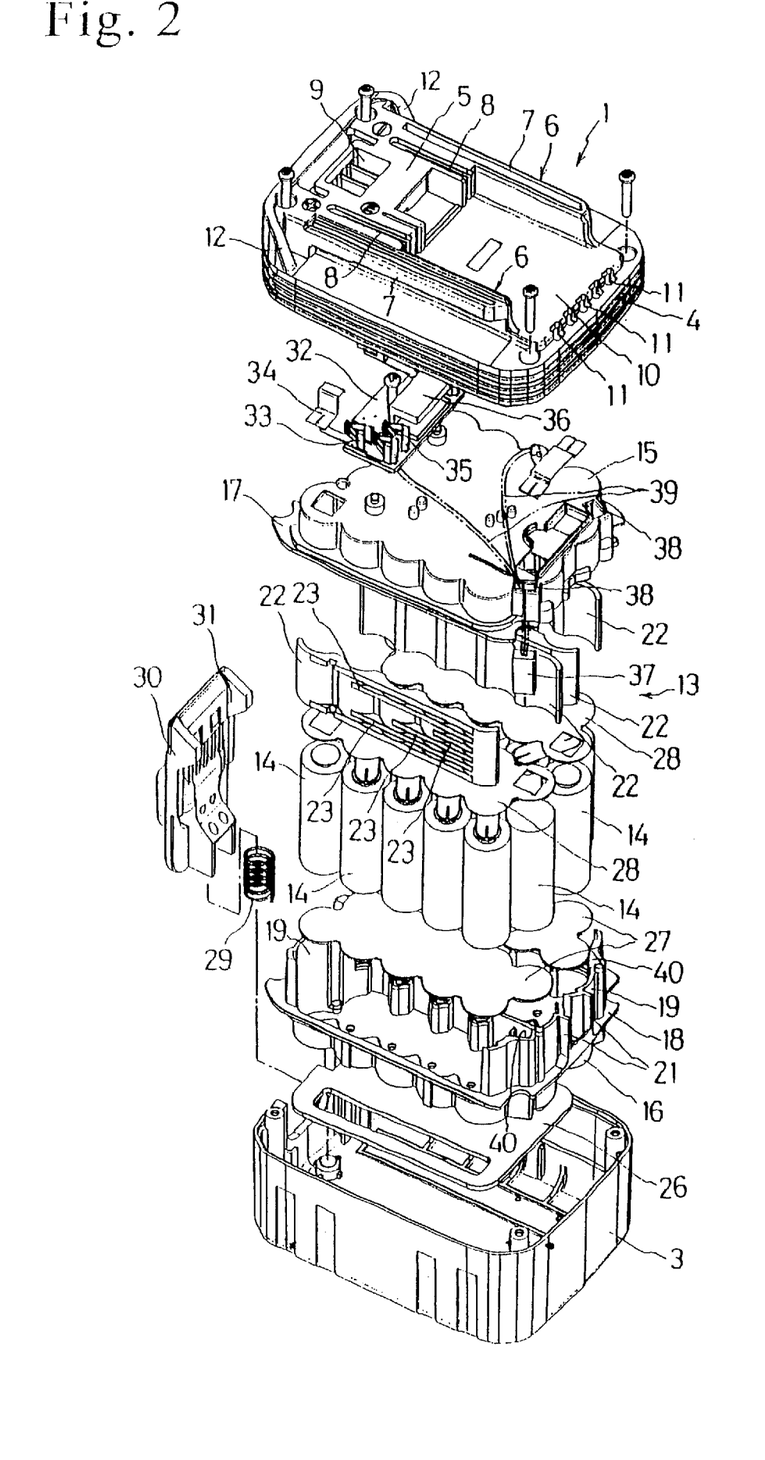
FIG. 2 is an exploded perspective view of the battery pack of FIG. 1.

FIG. 1 is a perspective view of a battery pack 1 in accordance with the present invention and FIG. 2 is an exploded perspective view of the battery pack 1. Referring to FIGS. 1 and 2, the battery pack 1 is formed of a double-structured enclosure. The battery pack 1 includes an outer enclosure 2 and inner case 13 which contains a plurality of cells, with the outer enclosure 2 housing the inner case 13. In addition, the inner case is formed smaller than the outer enclosure so as to fit snugly within the outer enclosure. The outer enclosure 2 includes a lower enclosure 3 generally housing the inner case 13 and an upper enclosure 4 attached to the lower enclosure 3 with a plurality of screws which are driven downward along the height of the lower enclosure 3. Provided on the top surface of the upper enclosure 4 forming a common mounting portion to which a charger or a power tool (as will be described later) is to be attached are a top end 5 and a pair of parallel slide rails 6 extending in a forward direction from the top end 5 (in the direction opposite the top end 5 from the center of the pack's top surface). Each slide rail 6 includes an outwardly extending flange 7 along the entire length of the rail 6, thus forming an L-shaped cross section on a plane which extends orthogonal to the aforementioned forward direction. Provided at the top end 5 between and parallel to the pair of parallel slide rails 6 are slits 8. Provided in the central rear portion of the top end 5 in the upper enclosure 4 is a rectangular intake port 9 which passes through the upper enclosure 4. Also provided in the upper enclosure 4 forward of the top end 5 are discharge ports 11 which open to the external environment on the boundary of a step 10 formed between the pair of slide rails 6.

The inner case 13 includes a synthetic resin upper holder 15 and a lower holder 16 which are affixed to the upper and lower sides, respectively, of an assembly of twenty cells 14 held therein, the cells 14 being arranged in four rows of five cells each, with belt-shaped metal radiator plates 22 provided between the upper holder 15 and lower holder 16. The upper holder 15 and lower holder 16 are shaped and dimensioned so as to snugly and stably encase the cells 14. Furthermore, ribs 17 and 18 having edges which conform to the inner surface of the lower enclosure 3 are provided along the lower rim of the upper holder 15 and the upper rim of the lower holder 16, respectively, so as to prevent jarring or rattling of the cells within the outer enclosure 2 when the inner case 13 is held therein. Furthermore, in this structure, the cells 14 are spaced apart and separated into two groups (each of the divided groups of cells 14 hereinafter is referred to as a "cell group") held by the upper holder 15 and lower holder 16, with each group containing half the total number of cells.

Figure 3:
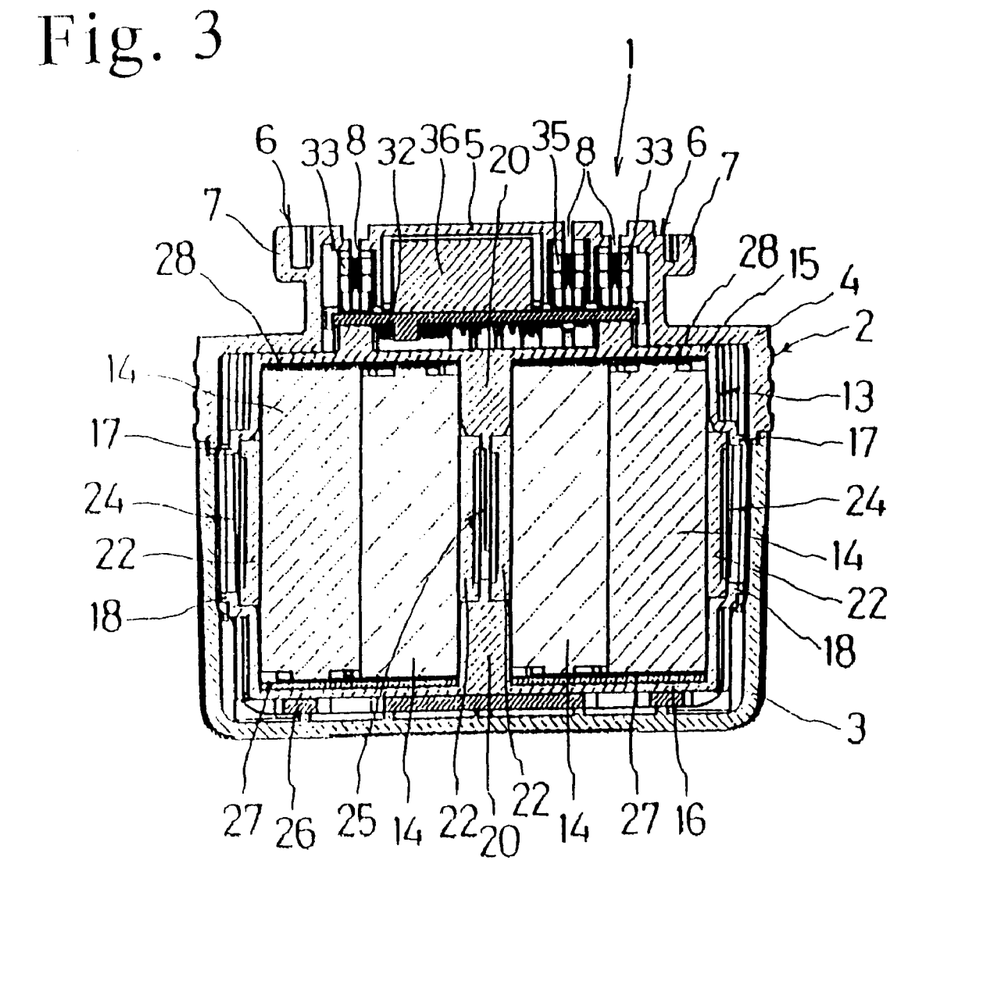
FIG. 3 is a cross-sectional view of the battery pack of FIG. 1.
Figure 5:
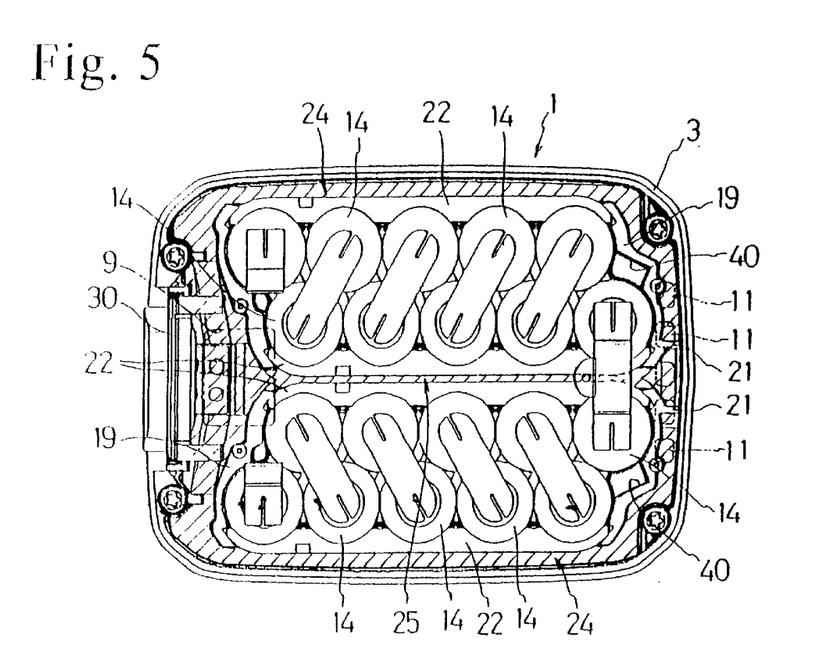
FIG. 5 is a top plan view of the battery pack of FIG. 1 with the upper enclosure and upper holder removed.
Figure 6:
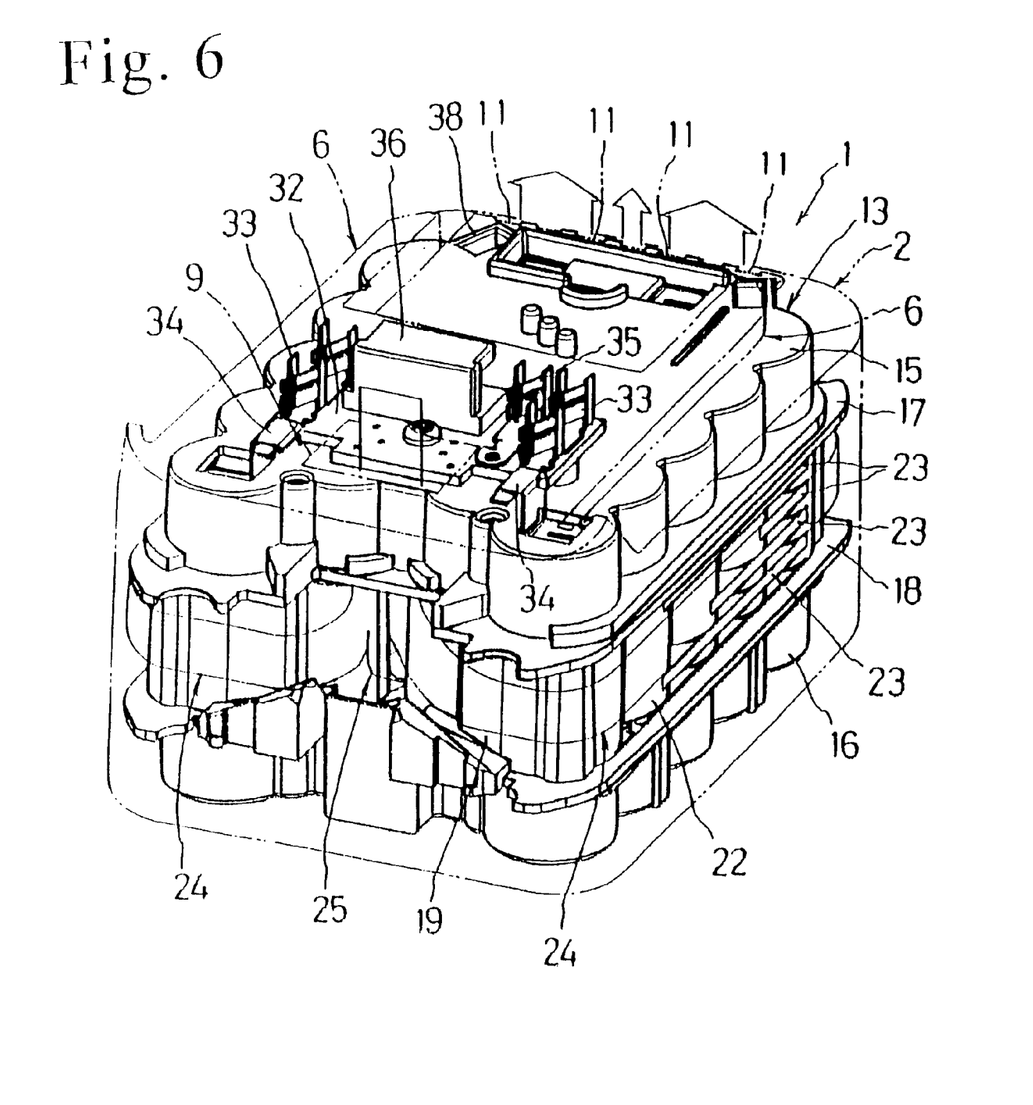
FIG. 6 is a perspective view of the inner case of the battery pack of FIG. 1.

In addition, provided at the front and rear ends of the lower holder 16 are extended portions 19 which protrude from the ribs 18 and are joined to the upper holder 15 such that, as shown in FIGS. 3 and 5, the radiator plates 22 provided on the outer sides of each of the cell groups are secured by being fitted between the upper holder 15 and lower holder 16 horizontally along the lengthwise direction between the ribs 17 and 18 and the cells 14, and vertically in the shorter direction between the extended portions 19 and cells 14. Similarly, the radiator plates 22 provided between the cell groups are fitted in the lengthwise direction between the respective cell groups and partition plates 20 which protrude between the cell groups from the upper holder 15 and lower holder 16, and in the shorter direction between the extended portions 19 and the cells 14. Furthermore, the surfaces of the radiator plates 22 conform to the projections and recesses of the corresponding surfaces of each row of cells 14 forming the perimeter of the cell groups, thus providing equal contact between the surfaces of the radiator plates 22 and the corresponding outer surface of the cells therein. Additionally, as shown in FIGS. 2 and 6, four fins 23 are formed in parallel on the outer surfaces of the radiator plates 22, beginning at the front end thereof and extending in the rearward direction. With the exception of the uppermost fin, the three lower fins 23 are disposed laterally in a step-like arrangement such that the lengths of the fins increase towards the lowest fin (i.e., the lowest and highest fins are the longest and the second highest fin is the shortest) and thus the surface area of the heat-preventing plates 22 increases with proximity to the front of the battery pack.

Thus, the cell groups are enclosed in a tightly-packed fashion or in a substantially sealed manner within the inner case 13, defining first air passages 24 within the outer enclosure 2, indicated by the hatched area in FIG. 5, which surrounds the inner case 13 between the ribs 17 and 18 and communicates with a second air passage 25 (also indicated by the hatched area) penetrating from the rear to the front of the inner case 13. The forward and rear portions of the rib 17 are recessed so as to provide communication between the intake port 9 and the discharge ports 11 of the upper case 4. Thus, as indicated by the arrows in FIG. 6, the divisions in the interior of the battery pack 1 are formed such that air entering from the air intake port 9 is separated into three airflows which pass through the pack, with the first air passages 24 leading from the intake port 9 to the exterior via the discharge ports 11 and the second air passage 25, which penetrates the inner case 13 and extends forward, also exiting to the exterior from the discharge ports 11. Furthermore, referring to FIG. 4, vertically-disposed air current adjustment plates 21 are provided on the front extended section 19 on both sides of the second air passage 25, causing the flow of air through the first air passages 24 and the flow of air through the second air passage 25 to be guided to the exhaust ports 11 independently.

Referring again to FIGS. 2 and 3, also provided are a rubber sheet 26 laid between the bottom surface of the inner case 13 and the inner surface of the lower case 3, sponge sheets 27 laid between the cell groups and the lower holder 16, and insulating sheets 28. Furthermore, provided in the rear of the battery pack 1 are a coil spring 29 and a hook 30 upwardly biased by the coil spring 29. The hook 30 includes a prong 31 protruding upward through the upper case 4 when the battery pack 1 is assembled as best shown in FIG. 1.

Figure 4:
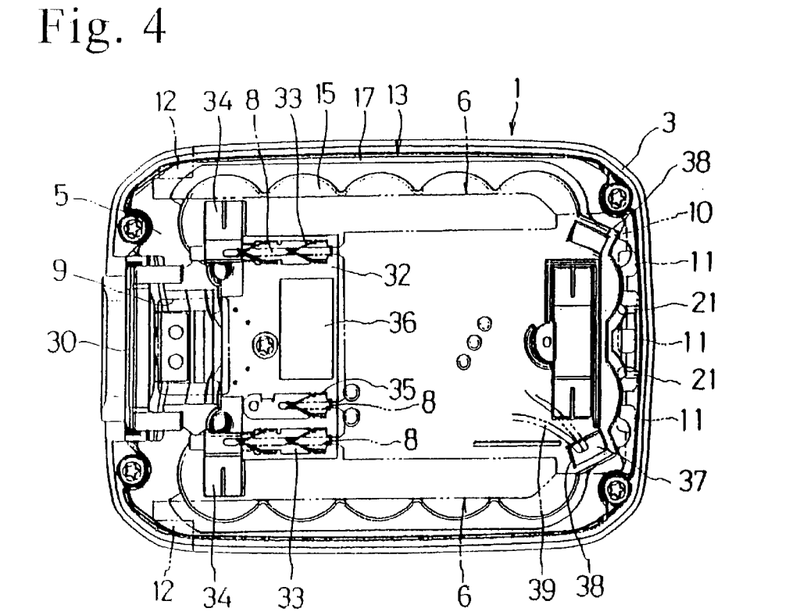
FIG. 4 is a top plan view of the battery pack of FIG. 1 with the upper enclosure removed.

Additionally, a board 32 is secured with screws to the rear of the upper surface of the upper case 15 (shown in FIGS. 2, 4 and 6). Laterally disposed on the upper side of the board 32 are charge/discharge terminals 33. Lead connector plates 34 electrically connect the charge/discharge terminals 33 with the exposed electrodes of the terminal cells of the cell groups through apertures in the upper holder 15. Provided between the charge/discharge terminals 33 on the board 32 are a temperature detection terminal 35 and a connector-type data transmission terminal 36. When the board 32 is housed in the outer enclosure 2, the charge terminal 33 and the temperature detection terminal 35 are exposed to the exterior environment through the slits 8 formed in the upper enclosure 4 with the data transmission terminal 36 also exposed in the forward direction. Furthermore, the charge terminal 33 is formed longer than the temperature detection terminal 35 so as to achieve the necessary contact pressure when the battery pack is attached to a power tool.

Furthermore, as shown in FIG. 2, a temperature sensor 37 (for example, a thermistor) is connected to the temperature detection terminal 35. The temperature sensor 37 and leads 39 pass downward through one of through-holes 38 in the front end of the upper holder 15, and the temperature sensor 37, in attachment to the bottom holder 16, is inserted between the cells 14 and the extended portion 19 and affixed to the cells 14. Here, an inclined surface 40 is provided on the inner surface of the extended portion 19 so as to keep the temperature sensor 37 pressed against the cells 14 upon insertion of the temperature sensor.

Figure 7:
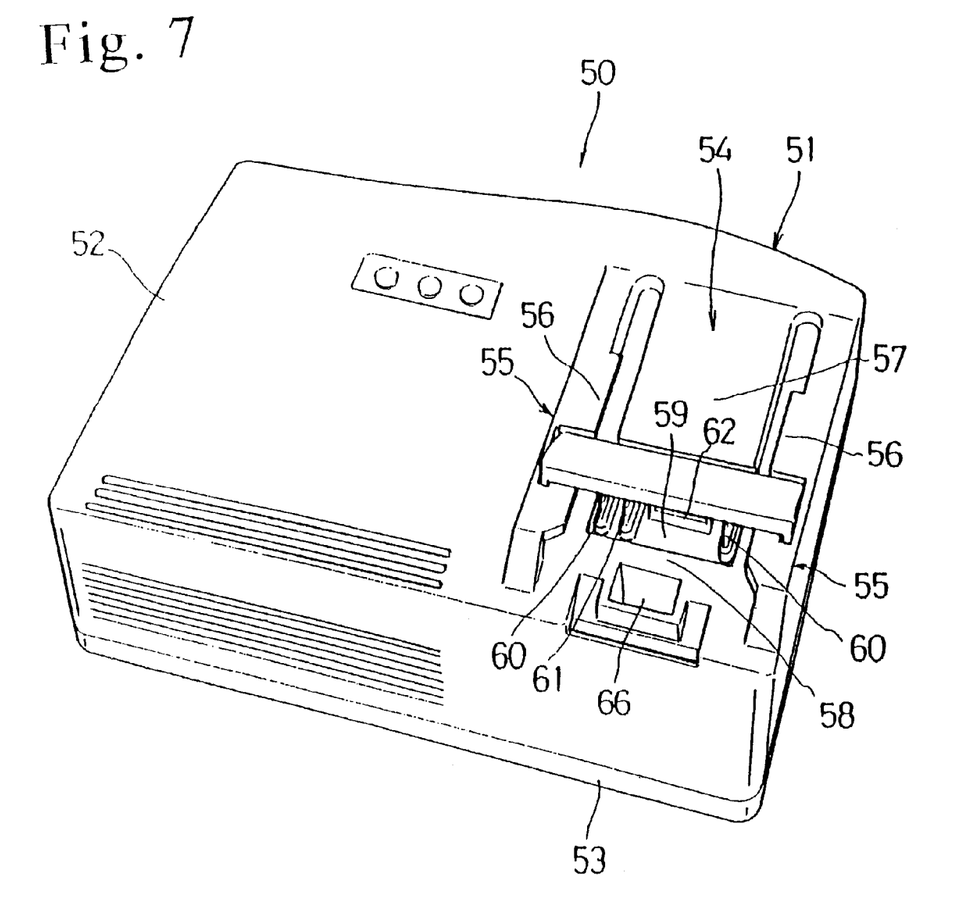
FIG. 7 is a perspective view of a charger for charging the battery pack of FIG. 1.

FIG. 7 shows a perspective view of a charger 50 onto which the battery pack 1 is set. The charger 50 includes a main case 51 with an upper case 52 and a lower case 53, an internal board comprising a charging circuit, and a connecting portion 54 formed integrally in the upper side of the upper case 52 to which the battery pack 1 can be removably attached for charging. The connecting portion 54 includes a pair of parallel guide rails 55 which are spaced apart by a distance greater than the distance between the outermost edges of the flanges 7 of the slide rails 6 on the battery pack 1. In addition, an extension 56 projects a short distance inward from the top surface of each guide rail 55 before extending downward. The slide rails 6 of the inverted battery pack 1 are inserted between the guide rails 55 at the rear of the charger 50 (the closer end of the charger as seen in FIG. 7 will be hereafter referred to as its rear), so that the guide rails 55 can hold the slide rails 6 therebetween. The battery pack 1 is then moved forward with the slide rails 6 sliding along the guide rails 55 until stoppers 12 (see FIGS. 1 and 2) at the farthest rear side of the top end 5 of the battery pack 1 come into abutment with the rear ends of the guide rails 55.

In addition, the connecting portion 54 of the charger 50 includes a front portion 57 and a rear portion 58 which is generally located at a lower plane than the front portion 57 so as to form a transverse step therebetween that spans the guide rails 55. The front portion 57 provides a flat surface which abuts and supports the step 10 of the battery pack 1 when the battery pack 1 is set on the charger 50.

Furthermore, the surface of the connecting portion 54 is sloped generally downward to the front end thereof such that the weight of the battery pack 1 facilitates the battery pack's sliding motion and stabilizes the battery pack 1 when it is set in place.

Figure 8:
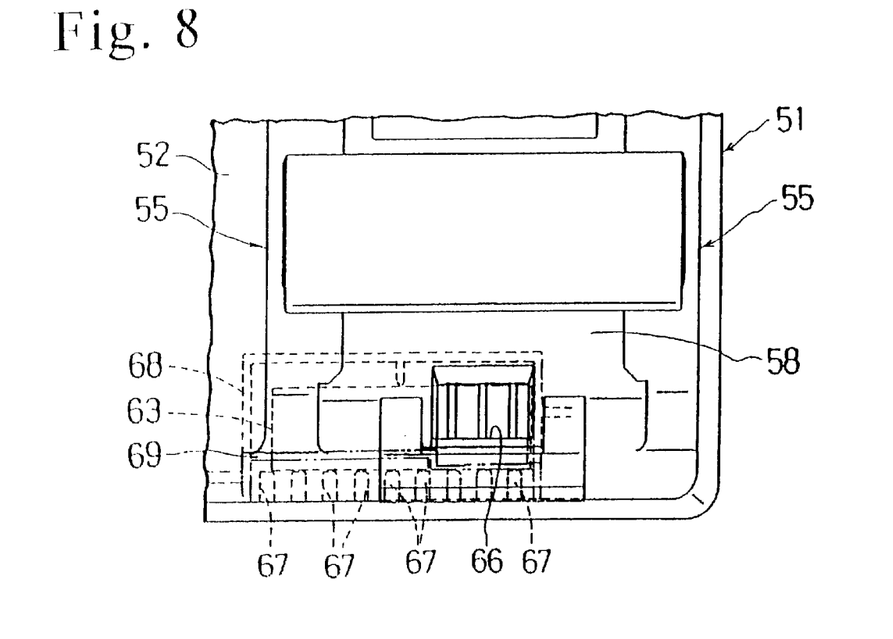
FIG. 8 is a plan view of the portion the charger of FIG. 7 accommodating a fan.
Figure 9:
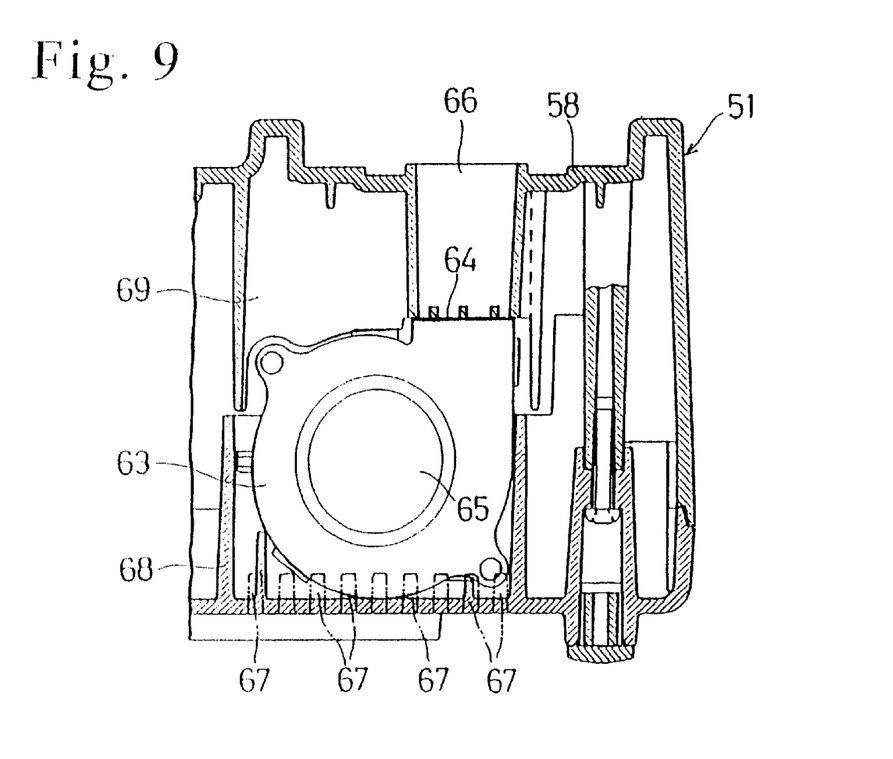
FIG. 9 is a cross-sectional view of the portion accommodating the fan of the charger shown in FIG. 7.

Also provided in the rear portion 58 of the connecting portion 54 is a terminal block 59 which includes charging terminals 60, a temperature detection terminal 61, and a connector-type data transmission terminal 62. Referring to FIGS. 8 and 9, a cooling fan 63 is provided inside the charger case 51 rearward of the terminal block 59. The fan 63 is positioned along the longer side of the charger case 56 and has an upwardly-directed airflow supply port 64 connected in communication with a square airflow passageway 66 which is integrally formed in the upper case 52. The cooling fan 63 additionally includes an intake port 65 which faces rearward. Also integrally formed in the lower case 53 are air intake ports 67 for supplying cooling air. Furthermore, a partition wall 68 is provided in the lower case 63 so as to enclose the portion of the fan 63 lying within the lower case 63, whereas a corresponding vertically-disposed partition wall 69 is integrally provided in the upper case 52 so as to conform to the upper surface of the fan 63 other than the portions connecting the airflow supply port 64 and the airflow passageway 66. In this way, only air from the exterior of the charger 50 is supplied to the fan 63 through the intake port 65.

Figure 10:
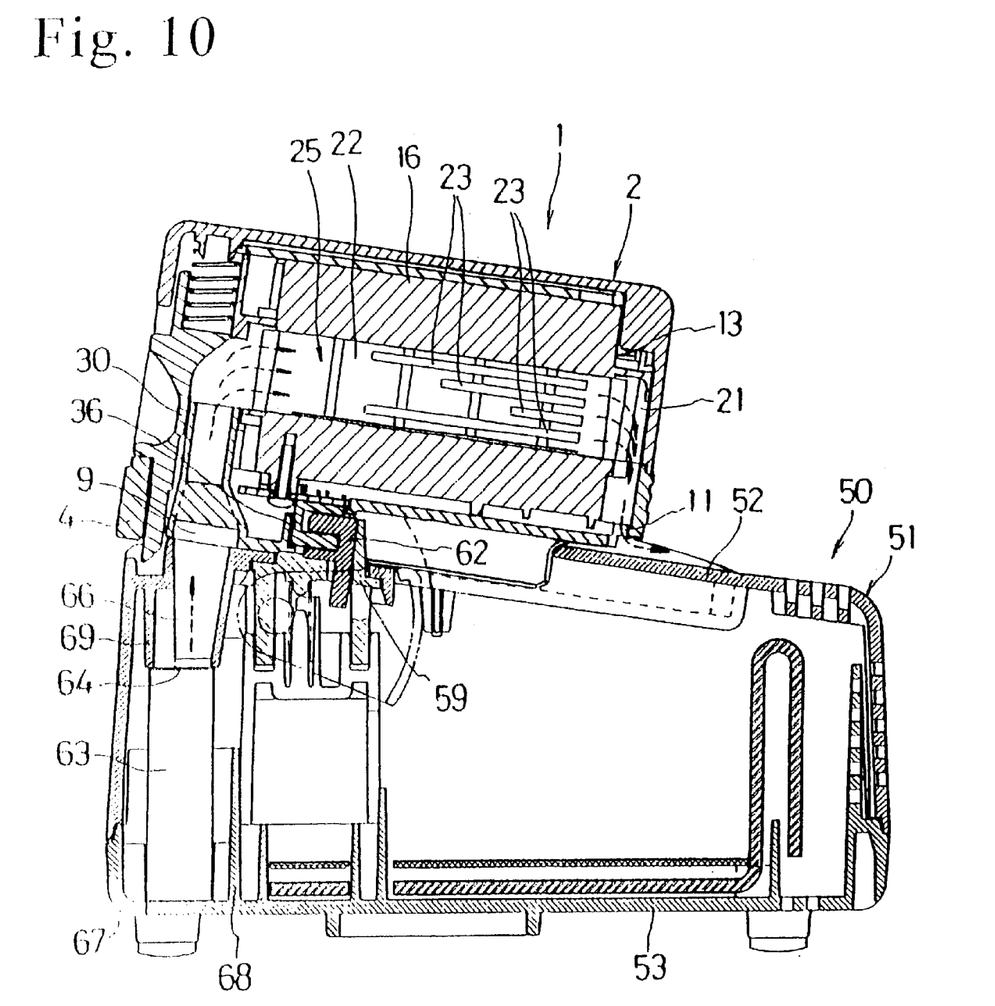
FIG. 10 is a cross-sectional view showing the battery pack of FIG. 1 mounted onto the charger.

During charging of the battery pack 1 so constructed, when the slide rails 6 of the above mentioned battery pack 1 are placed between the guide rails 55 of the charger 50 and the battery pack slid forward until the pack's stoppers 12 come into abutment with the rear ends of the guide rails 55, charging terminals 60 and a temperature detection terminal 61 in the terminal block 59 advance into the slits 8 of the top end 5 of the battery pack and make electrical contact with the corresponding charge/discharge terminals 33 and the temperature detection terminal 35, respectively, while the data transmission terminals 36 and 62 are also brought into electrical contact, and charging begins. As shown in FIG. 10, in this state of attachment, the air intake port 9 of the battery pack 1 is positioned directly above the airflow passageway 66 of the charger 50, placing both channels in communication with each other.

During a charge, the heat radiator plates 22 radiate the heat generated by the cells 14 that is transferred to the radiator plates 22. The fan 63 simultaneously starts operation at the start of charging, thus cooling air drawn through the air intake ports 67 is discharged upwards from the airflow supply port 64, and this airflow, as indicated by the dotted-line arrows, is introduced through the airflow passageway 66 of the charger 50, after which it proceeds through the air intake port 9 and on to the interior of the outer case 2 of the battery pack 1, passes along the first air passages 24 and the second air passage 25 (the airflow along the second air passage 25 is shown in FIG. 10), and is discharged to the exterior from the discharge ports 11. Thus, the radiator plates 22 are cooled by the airflow described above, thereby suppressing increases in temperature of the cells 14. Additionally, in this arrangement, as the inverted battery pack faces downward when attached, the air intake port 9 as well as the discharge ports 11 opens in the downward direction, and so remain unexposed.

Figure 11A:
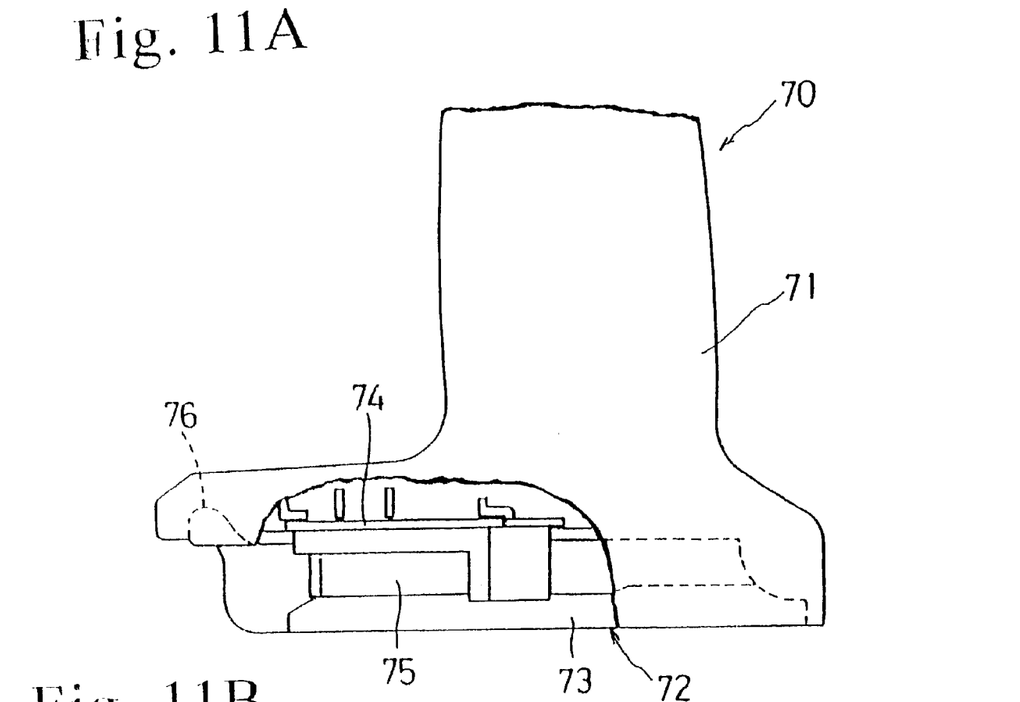
FIG. 11A is a partially broken side view showing a power tool's handle to which the battery pack of FIG. 1 is attached.
Figure 11B:
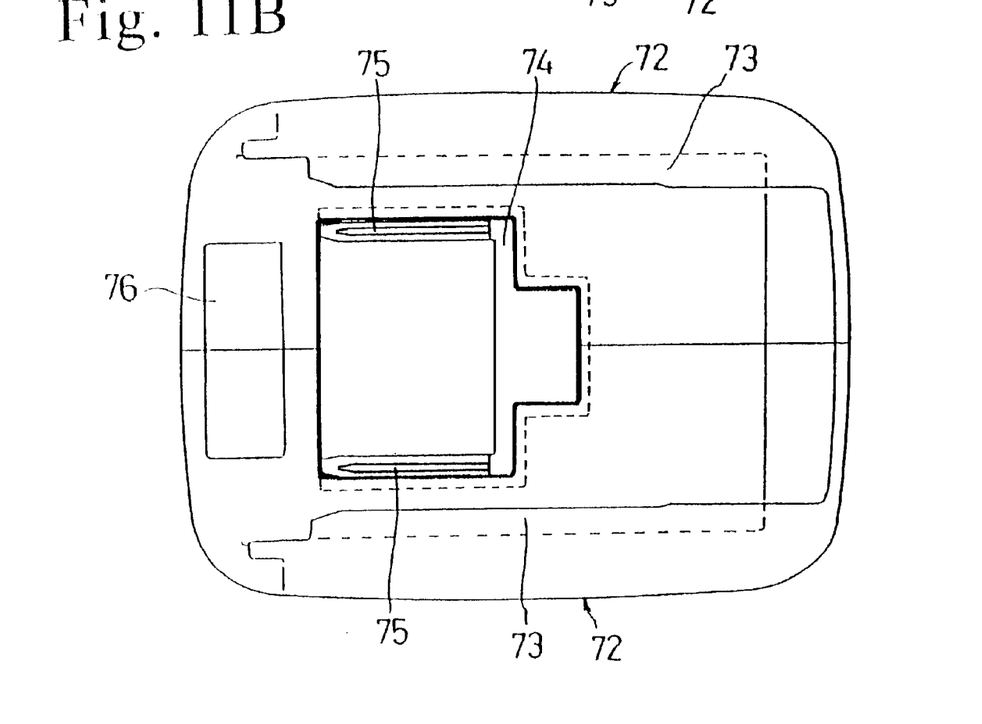
FIG. 11B is a bottom plan view of the power tool's handle shown in FIG. 11A.

According to the present invention, the air intake port 9 and discharge ports 11 are likewise in this unexposed condition when the battery pack 1 is attached to a power tool. FIG. 11A is a side elevation view of a handle 71 of a power tool 70, whereas FIG. 11B is a bottom plan view of the power tool's handle. The battery pack is similarly slid for attachment to the handle 71, in which guide rails 72 for engaging the slide rails 6 of the battery pack 1 are formed on both sides of the bottom end of the handle 71. Furthermore, a flange 73 is formed on the underside of each guide rail 72, with the flanges 73 extending inwardly generally the entire length of the respective guide rails 72. Provided between the guide rails 72 is a terminal block 74 with positive and negative terminal strips 75 that extend in parallel to the guide rails 72. The electric power tool also includes a recess 76 for engaging the prong 31 of the hook 30 when the battery pack 1 is attached to the tool.

Figure 12:
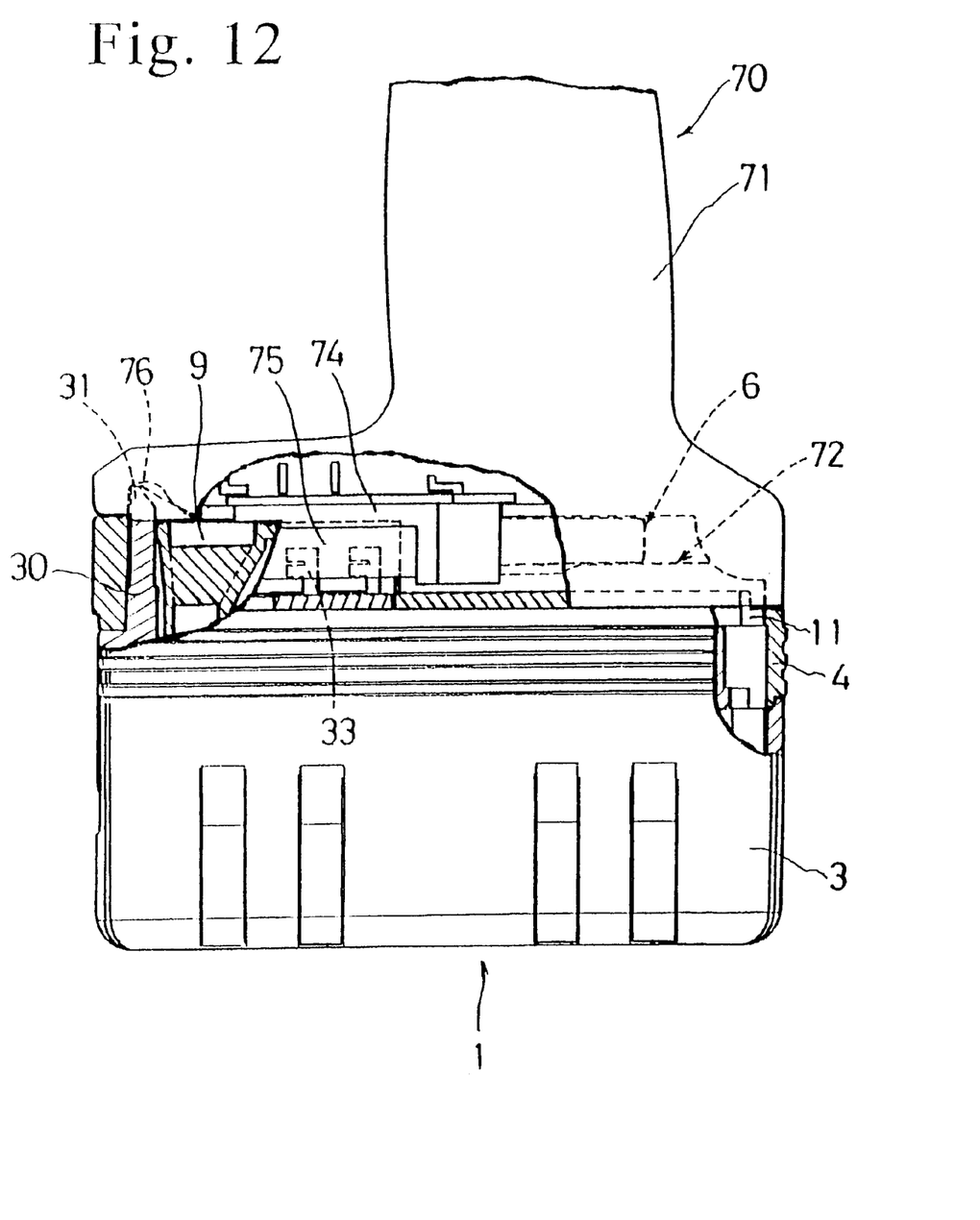
FIG. 12 is a cross-sectional view describing how the battery pack of FIG. 1 is mounted onto the power tool.

Thus, when the slide rails 6 of the battery pack 1 are engaged by and slid between the guide rails 72 of the handle 71, the pack 1 is attached to the tool as shown in FIG. 12, in the same manner as in the attachment of the battery pack to the charger 50. Upon attachment, the terminal strips 75 of the terminal block 74 are simultaneously inserted into the slits 8 of the battery pack 1, making electrical contact with the charge/discharge terminals 33. In this connected state, as the connection portion of the battery pack 1 is covered by the handle 71, the air intake port 9 and exhaust ports 11 are both positioned at the under surface of the handle 71 rather than being exposed to the exterior environment.

According to the above embodiment, cooling air is introduced to the interior of the outer case 2 from the air intake port 9 and proceeds to flow around and between the cell groups, and is discharged from the exhaust ports 11 formed in the upper case 4 by way of the first air passages 24 and the second air passage 25. Thus, when the battery pack 1 is attached to the charger 50, the communication between the air intake port 9 as well as the discharge ports 11 and the charger 50 remains unexposed to the environment, while when the battery pack 1 is attached to the power tool 70, the air intake port 9 and discharge ports 11 and the handle 71 remain unexposed to the environment. Therefore, even as provided with the air passages 24 and the second air passage 25 through which cooling air passes, this structure enhances the reliability and life span of the battery pack 1 while alleviating concerns of problem conditions such as short-circuiting, rusting, and corrosion.

Furthermore, the battery pack's dual structure, in which the first air passages 24 and the second air passage 25 are separated from the cell groups by the inner case 13, which includes the radiator plates 22 in contact with the cell groups, allows maintenance of the ideal cooling effect due to the radiator plates 22 and enhanced dust proof effect on the cell groups. Especially regarding the radiator plates 22, as the inner surfaces thereof conform to the protrusions and recesses of the outer surfaces of the cell groups, this provides even contact with the cells 14, causing heat generated by the cells 14 to be transferred evenly to the radiator plates 22, reducing irregularity in the cooling effect on the cells 14. Moreover, the fins 23 that are provided on the outer surfaces of the radiator plates 22 are formed such that the number of fins increases as the flow progresses downward. So even as the temperature of the air flowing along the radiator plates 22 increases due to heat exchanged by the radiator plates 22, the increased number of fins 23 results in a greater cooling capacity to counteract this greater amount of heat, thus securing cooling effect of the cells 14 by the radiator plates 22 along the entire length of the radiator plates 22.

Furthermore, the design is not limited to the number and shape of air intake port 9 and exhaust ports 11 mentioned above; rather, the numbers of fins may be increased or decreased and the designed may be changed as desired. Additionally, whereas a sliding method is used in the above embodiment for attachment of the battery pack to a charger or power tool, according to the present invention methods wherein a portion of a battery pack is inserted into the charger or power tool may be employed.

Further regarding formation of the air passages, the cells alternatively may be so configured as to be separated into three or more cell groups or blocks, thereby increasing the number of air passages; furthermore, there is no obstacle to having the air passages oriented along groups of cells from left to right, or vice versa, rather than only front to back. Naturally, another structure of an inner case is possible in which separate air passages are formed merely by partition walls within the outer case. In this modification, the radiator plates are disposed in the partition walls so as to be brought into contact with portions of the cells, without the use of a fully double-structured case which includes an inner case for holding the cells therein.

Figure 13:
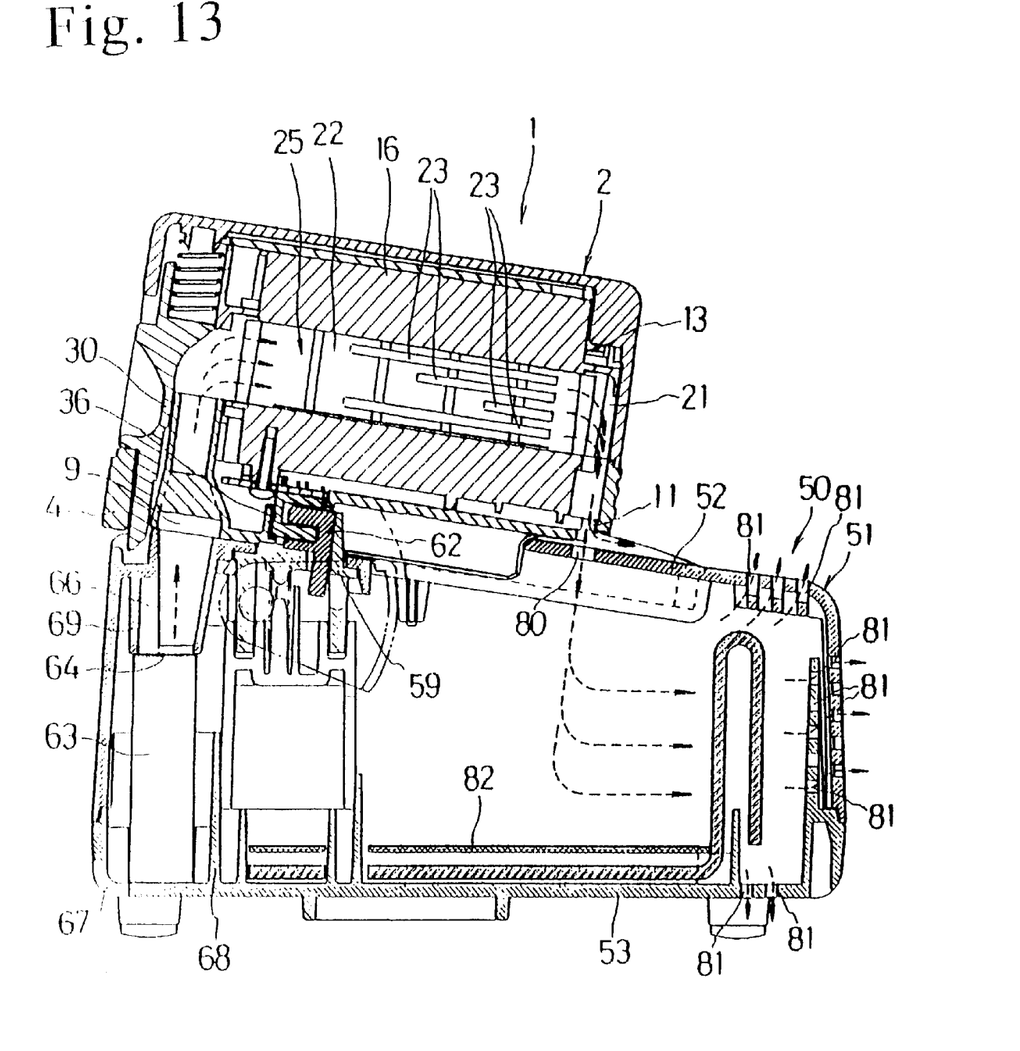
FIG. 13 is a cross-sectional view showing a modification of the charger shown in FIG. 7 with the battery pack of FIG. 1 mounted thereon.

The charger may also be changed as shown in FIG. 13. In this particular modification, as shown by the dotted/dashed line arrows, when the battery pack 1 is in attachment with the upper case 52, air inlet ports 80 are disposed directly below the discharge ports 11, and air exhaust ports 81 are disposed at the top, bottom, and sides of the main case 51, thus causing the airflow to be discharged from the air inlet ports 80 and then again from the exhaust ports 81 provided in the charger 50, thus also cooling the board 82 and other structures of the charger 50, further enhancing protection of the charging circuitry. In conventional battery chargers, the charging circuitry is protected by a reduction in the charging current, which results in longer charging times. However, the relationship between temperature and charging time also means that cooling allows the charging current to be similarly increased, thus shortening the charging time.

Equivalents

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

What is claimed is:

1. A battery pack comprising:

an outer enclosure containing a plurality of battery cells and having a mounting portion adapted to be removably attached to a charger and a battery powered device;

at least one intake port provided in the mounting portion for introducing into the battery pack cooling air supplied from a charger;

at least one discharge port provided in the mounting portion for discharging the cooling air from the battery pack; and at least one air passage connecting the at least one intake port to the at least one discharge port, the at least one air passage allowing the cooling air introduced through the at least one intake port to flow one of along and between the cells and to be discharged through the at least one discharge port.

2. A battery pack in accordance with claim 1, wherein the mounting portion includes a substantially rectangular top plate having a first edge and an opposite second edge, the at least one intake port being formed on the top plate in proximity to the first edge and the at least one discharge port being formed in proximity to the second edge.

3. A battery pack in accordance with claim 1, wherein the mounting portion is contoured to generally correspond to a connecting portion of the charger and those of said electric devices such that, when the battery pack is attached to any of the charger and said electric devices, the at least one intake port and the at least one discharge port are unexposed to the exterior environment of the battery pack and the electric device to which the battery pack is attached.

4. A battery pack in accordance with claim 2, wherein when the battery pack is attached to the charger, a narrow gap is formed at least along the second edge of the top plate between the mounting portion of the battery pack and a connecting portion of the charger so as to facilitate discharge of cooling air from the at least one discharge port.

5. A battery pack in accordance with claim 4, wherein the mounting portion includes a step along the second edge where the at least one discharge port are provided, the step forming the narrow gap with the connecting portion of the charger.

6. A battery pack in accordance with claim 1, further comprising an inner case holding the cells and including a plurality of radiators in contact with the cells, and wherein the at least one air passage is separated from the cells by the inner case.

7. A battery pack in accordance with claim 6, wherein each radiator is a radiator plate having a plurality of fins protruding into the air passage and oriented substantially in parallel to the direction of flow of cooling air introduced through the at least one intake port.

8. A battery pack in accordance with claim 7, wherein the number of fins of each radiator plate increases in the downstream direction of the cooling airflow.

9. A battery pack in accordance with claim 7, further comprising a pair of slide rails on the mounting portion, and wherein each of the charger and the electric devices includes on a connecting portion thereof a pair of guide rails which slidably engage the slide rails such that the battery pack is attached to the charger and the electric devices by slide motion.

10. A battery pack in accordance with claim 6, wherein the plurality of cells are divided into two groups by a gap extending from a first end portion to a second end portion of the inner case along a longitudinal axis of the battery pack.

11. A battery pack in accordance with claim 6, wherein the outer enclosure includes two inner longitudinal walls and the inner case includes two outer longitudinal walls which opposes the inner longitudinal walls across a selected distance so as to at least partially define at least two air passages between the outer longitudinal walls and the inner longitudinal walls.

12. A battery pack in accordance with claim 1, wherein the electric devices include electric power tools.

13. A battery pack in accordance with claim 1, wherein the charger includes a housing, at least one inlet port provided in the housing, and at least one exhaust port provided in the housing, the at least one inlet port being located in the portion of the housing directly opposing the at least one discharge port of the battery pack so as to allow the cooling air discharged out of the discharge port of the battery pack to reenter the charger through the inlet port and to be discharged from the charger through the exhaust port.

* * * * *